US008619918B2

(12) United States Patent
Khojastepour et al.

(10) Patent No.: US 8,619,918 B2
(45) Date of Patent: Dec. 31, 2013

(54) SPARSE CHANNEL ESTIMATION FOR MIMO OFDM SYSTEMS

(75) Inventors: Mohammad A. Khojastepour, North Brunswick, NJ (US); Krishna S. Gomadam, Irvine, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 982 days.

(21) Appl. No.: 12/395,679

(22) Filed: Mar. 1, 2009

(65) Prior Publication Data

US 2010/0074358 A1 Mar. 25, 2010

Related U.S. Application Data

(60) Provisional application No. 61/100,136, filed on Sep. 25, 2008.

(51) Int. Cl.
*H04L 27/06* (2006.01)

(52) U.S. Cl.
USPC ........... 375/340; 375/260; 375/267; 375/299; 375/347; 455/101; 455/132; 455/296; 455/500; 455/562.1; 370/334

(58) Field of Classification Search
USPC .......... 375/260, 267, 299, 340, 347; 455/101, 455/132, 296, 500, 562.1; 370/334
See application file for complete search history.

(56) References Cited

PUBLICATIONS

Adler, J. et al., "Comparison of Basis Selection Methods", 1997 IEEE.
Cotter, S.F. et al., "Sparse Channel Estimation via Matching Pursuit with Application to Equalization", IEEE Transactions on Communications, vol. 50, No. 3, Mar. 2002.
Negi, R et al., "Pilot Tone Selection for Channel Estimation in a Mobile OFDM System", IEEE Transactions on Consumer Electronics, vol. 44, No. 3, Aug. 1998.
Tao, T., "An Uncertainty Principle for Cyclic Groups of Prime Order", 1991 Mathematics Subject Classification 42A99, Jul. 22, 2004.
Coleri, S. et al., "Channel Estimation Techniques Based on Pilot Arrangement in OFDM Systems", IEEE Transactions on Broadcasting, vol. 48, No. 3, Sep. 2002.
Candes, E. et al., "Robust Uncertainty Principles: Exact Signal Reconstruction from Highly Incomplete Frequency Information", Jun. 2004; Revised Aug. 2005.
Candes, E. et al., "Quantitative Robust Uncertainty Principles and Optimally Sparse Decompositions", Applied and Computational Mathematics, Caltech, Pasadena, CA, Nov. 2004; Revised Jun. 2005 & Jul. 2006.
Sharp, M. et al., "Application of Sparse Signal Recovery to Pilot-Assisted Channel Estimation".

(Continued)

*Primary Examiner* — Leon Flores
(74) *Attorney, Agent, or Firm* — Joseph Kolodka

(57) ABSTRACT

A method for sparse channel estimation in MIMO OFDM systems with a plurality of subchannels having the same sparsity structure is presented. The inventive method comprises initializing a plurality of residual vectors and observation generating matrices modeling the channel, sending a pilot signal for each subcarrier, converting the pilot signals to tap positions, detecting an optimal tap position, updating the residual vectors by removing the one residual vector having the optimal tap position, updating the generating matrices in accordance with the optimal residual vector, calculating weighted residuals based on the updated residual vectors, and repeating the steps, except initializing, until a stopping condition is met, wherein the updated observation matrices estimate the sparse channel. In one embodiment, the observation generating matrices are omitted. In one embodiment, multiple vectors are removed during one iteration. Pilot placement and pilot allocation techniques are presented to optimize the method.

15 Claims, 3 Drawing Sheets

(56) References Cited

PUBLICATIONS

Mallat, S.G. et al., "Matching Pursuits with Time-Frequency Dictionaries", IEEE Transactions on Signal Processing, vol. 41, No. 12, Dec. 1993.

Tropp, J.A. et al., "Signal Recovery from Random Measurements via Orthogonal Matching Pursuit", IEEE Transactions on Information Theory, vol. 53, No. 12, Dec. 2007.

Cotter, S.F et al., "Sparse Solutions to Linear Inverse Problems with Multiple Measurement Vectors", IEEE Transactions on Signal Processing, vol. 53, No. 7, Jul. 2005.

Dongming, W. et al., Channel Estimation Algorithms for Broadband MIMO-OFDM Sparse Channel, the 14th IEEE 2003 International Symposium on Personal, Indoor and Mobile Radio Communication Proceedings, 2003.

Donoho, D.L. et al., "Sparse Solution of Underdetermined Linear Equations by Stagewise Orthogonal Matching Pursuit", Mar. 2006.

Candes, E. et al, "Near Optimal Signal Recovery from Random Projections: Universal Encoding Strategies?", Oct. 2004, revised Mar. 2006.

Candes, E et al. "Practical Signal Recovery from Random Projections" Jan. 25, 2005.

SPARSE CHANNEL ESTIMATION FOR MIMO OFDM SYSTEMS

CROSS REFERENCE RELATED APPLICATIONS

The present invention claims the benefit of U.S. provisional patent application 61/100,136 filed Sep. 25, 2008, the entire contents and disclosure of which are incorporated herein by reference as if fully set forth herein.

FIELD OF THE INVENTION

The present invention relates generally to channel estimation for Multiple Input Multiple Output (MIMO) Orthogonal Frequency Distribution Multiplex (OFDM) systems. The invention concerns improving channel estimation quality and reducing overhead for the same channel estimation quality and extending the theory of sparse signal recovery for application in MIMO OFDM channel estimation problems.

BACKGROUND OF THE INVENTION

OFDM based wireless systems require the channel to be determined at the receiver for all subcarriers. Channel estimation for OFDM systems is traditionally approached in the frequency domain, using pilot signals, by estimating the frequency response for a few selected subcarriers and using those observations to interpolate the rest of the subcarriers. Typically, pilot signals or symbols are transmitted over a few subcarriers. Using the received information for those subcarriers, the receiver tries to estimate the channel for the remaining subcarriers. More the number of pilots, more the estimation accuracy. Hence, with this approach, the number of pilots required depends on the coherence bandwidth of the channel; the higher the bandwidth, the lesser the number of pilots.

However, sending pilots involves overhead since bandwidth and power, which could otherwise be used for sending useful data, are expended in sending those pilots. The problem therefore is to minimize the channel estimation overhead while maintaining certain accuracy level for the estimates. The problem becomes even more challenging with multiple antenna systems since there are a lot more channels or channel coefficients to be estimated. Typically, the overhead scales linearly with the number of transmit antenna.

Further, the above approach takes into account only the length of the impulse response and ignores the sparsity of the wireless channel. Wireless channels are typically sparse; the time domain impulse response of the wireless channels typically has a very few nonzero taps, that is, the largest tap delay is usually much greater than the number of nonzero taps.

Channel sparsity is attractive from a system design perspective since it can be exploited to design more efficient channel estimation strategies. It has been shown that a discrete time signal of length M with only T nonzero coefficients can be exactly reconstructed just by observing any 2T samples of its discrete Fourier transform (DFT) if M is prime. Notice that the number of observations required does not depend on the DFT size M. This result has a direct application in high data rate OFDM systems where the number of subcarriers is large. Due to small symbol duration, the length of the discrete time channel response will be large while there may be only very few nonzero coefficients. In such a case, only very few subcarrier pilots are required to estimate the frequency response for all subcarriers.

The proposed optimal signal recovery principle described above is combinatorial in nature. It is essentially an exhaustive search over all possible choices that give rise to the given observations under the sparsity constraint. To avoid this problem, an optimization approach based on L1-norm minimization has been employed for channel recovery in Single Input Single Output (SISO) OFDM systems where the observations are corrupted with noise. The results indicate the scope for potential improvement in wireless channel estimation problems by using the theory of sparse signal recovery where the system model is not necessarily ideal due to noise and M being non-prime in general.

There have been many works on sparse signal recovery, most notably matching pursuit (MP). The MP algorithm iteratively identifies a small subset of the nonzero positions that contribute to most of the energy in the observations. Although the algorithm is suboptimal and greedy in nature, it is efficient in terms of performance and complexity. There are many variants of the algorithm depending on the way the positions are identified. In addition to MP, algorithms based on gradient search have also been proposed for sparse signal recovery.

BRIEF SUMMARY OF THE INVENTION

The present invention solves the above known problems, by providing a new framework for channel estimation in MIMO OFDM systems. As discussed above, sparse channel estimation refers to estimating the time domain channel impulse response by exploiting the fact that the channel has a very few nonzero taps. In addition, for point to point MIMO channels, the position of the nonzero taps will be the same for any transmit-receive antenna pair. In the present invention, this property is exploited to extend sparse signal recovery results for application to MIMO OFDM channel estimation problems. It is known that, for an $n_t \times n_r$ MIMO system, it is theoretically possible to reconstruct all the channels with just $(n_t+1)T$ pilots where T is the number of non-zero taps for each channel, when the observations are noiseless. A new form of orthogonal matching pursuit (OMP) is proposed herein that exploits the sparsity structure of the MIMO channel. For the noiseless case, the algorithm approaches the performance predicted by the theory. For faster operation of the algorithm, more than one column can be selected per iteration and/or some of the update-operations in the algorithm can be removed without significant loss in performance. In one embodiment, the focal underdetermined system solver (FOCUSS) algorithm for use in MIMO channel estimation can be employed. Additional embodiments can incorporate various design guidelines for pilot placement and allocation, which critically affects the performance of these schemes; these guidelines are based on theory and simulations for the noisy system model. The present invention enables the training overhead to be drastically reduced while maintaining the same accuracy as the current state of the art techniques.

The present inventive method is directed to a method for sparse channel estimation in MIMO OFDM systems with a plurality of subchannels having the same sparsity structure. The inventive method comprises initializing a plurality of residual vectors modeling a plurality of subcarriers and observation generating matrices modeling the channel, sending at least one pilot signal for each of the plurality of subcarriers, and converting the pilot signals to tap positions in the residual vectors. The method further comprises detecting an optimal tap position in one of the residual vectors, updating the plurality of residual vectors by removing the one residual vector having the optimal tap position, updating the observation generating matrices in accordance with the residual vector having the optimal tap position, calculating weighted residuals based on the updated residual vectors. These steps (except initialization) are repeated until a stopping condition is met. In one embodiment, the observation generating matrices are omitted. In one embodiment, multiple vectors are removed during one iteration. Pilot placement and pilot allocation techniques are presented to optimize the method.

The following abbreviations and notation are used throughout.

ABBREVIATIONS

BER: Bit Error Rate
BPSK: Binary Phase Shift Keying
DFT: Discrete Fourier Transform
FFT: Fast Fourier Transform
FOCUSS: FOCal Underdetermined System Solver
ISI: Inter-Symbol-Interference
MIMO: Multiple Input Multiple Output
MP: Matching Pursuit
MSE: Mean Square Error
OFDM: Orthogonal Frequency Distribution Multiplex
RF: Radio Frequency
SCM: Spatial Channel Model
SISO: Single Input Single Output
SNR: Signal to Noise Ratio
Notation:
Bold upper case letters to denote matrices and bold lower case letters to denote vectors. Further $(.)^*$, $(.)^T$, $(.)^t$ stand for conjugation, transposition and Hermitian transposition, respectively. $\circledR$ stands for the Kronecker product. $]E$ stands for the expectation operation. $v \sim CN(w, A)$ indicates v is a complex Gaussian column vector with $]E[v]=w$ and $]E[vv^t]=A$. The kth entry of the vector a is denoted by a(k).

BRIEF DESCRIPTION THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

Figure 1:
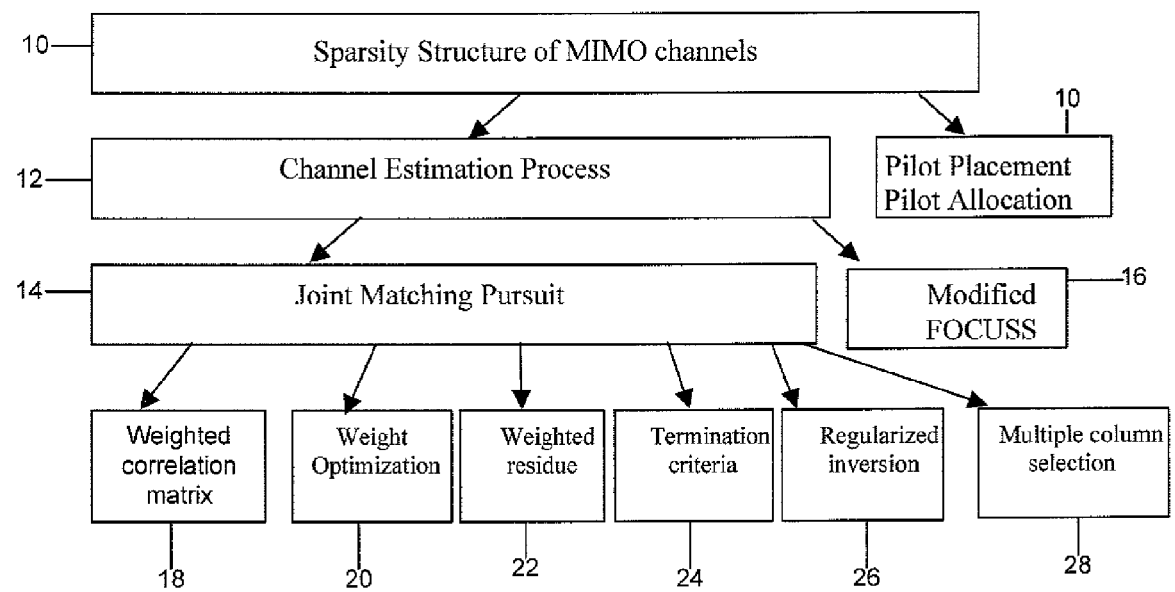
FIG. 1 is a schematic overview of the present invention.

The present invention advantageously provides a method for obtaining necessary and sufficient conditions determining the minimum number of pilots required for perfect channel recovery in an ideal system, where there is no noise at the receivers. The result provides guidelines for optimal pilot allocation and placement at the transmit antennas. Pilot allocation refers to how the pilots are allocated to different transmit antennas. Pilot placement refers to the selection of subcarriers that will carry the pilots. An exemplary embodiment of the invention includes a new weighted orthogonal matching pursuit (OMP) algorithm that exploits the aforementioned properties of the MIMO channel.

The following properties of the multipath MIMO channel can be exploited. One such property is that the channel between any pair of transmit and receive antennas has at most T taps, and $$\frac{T}{L}$$

is relatively small, where L is the maximum delay of spread. Another property is that the positions of the nonzero taps are identical for all the channels associated with the point to point MIMO system. This property follows from the fact that the propagation delay is roughly the same for all transmit-receive antenna pairs. Practical channel models such as Spatial Channel Model (SCM) used in 3GPP incorporate this property for generating multipath MIMO channels. Therefore, the unknown parameters in the system are the positions of the nonzero taps, T of them which are common to all channels, and $n_t n_r$ channel coefficients for each of the nonzero tap positions.

Consider a multipath environment with T clusters or scatterers. The impulse response between the ith transmitter and jth receiver is modeled as $$h_{ji}(\tau, t) = \sum_{p=1}^{T} \alpha_p^{ji}(t)\delta(\tau - \tau_p(t)T_s) \quad (1)$$

where $\alpha_p(t) \in \mathbb{C}$ and $\tau_p(t) \in \mathbb{R}^{++}$ are the magnitude and the delay for path p, respectively, and $T_s$ is the sampling interval of the system.

Notice that $r_p(t)$ need not be an integer. With block-fading channel assumption where the channel parameters are constant over a block and assuming perfect symbol level synchronization, the equivalent discrete time channel between transmit antenna i and receive antenna j can be modeled as $$h_{ji}(n) = \sum_{p=1}^{T} \alpha_p^{ji} g((n - \tau_p)T_8) \quad (2)$$

where g(t) represents the effect of the pulse shaping filter and the RF front-ends at both the transmitter and the receiver.

It can be noticed that in high data rate communication systems where $T_s$ is very small compared to the maximum delay spread, (2) results in a channel with a very few nonzero taps. For a raised-cosine filter with excess bandwidth of 0.5 or greater, the above channel will have approximately T non-negligible taps.

For the system model, consider a cyclic prefix based OFDM system with pilot aided channel estimation. Let M be the size of the FFT operations in the system. The channel estimation procedure consists of the following protocol. The training phase spans $n_t$ OFDM symbols, and it is assumed that the channel remains constant over the duration of the training phase. In the first slot, the first transmit antenna sends pilots in $Q_1$ subcarriers. The remaining $M-Q_1$ subcarriers are used for data transmission. In the second slot, the second transmit antenna sends pilots in $Q_2$ subcarriers. This procedure is followed until transmit antenna $n_t$ sends $Q_{nt}$ pilots. The set of pilots chosen for the transmit antennas need not be the same. The received pilots at receive-antenna j during the mth training slot is given by $$b_{jm} = \sqrt{P_m} S_m F h_{jn} + n_j, m = 1, 2, \ldots, n_r = A_m h_{jm} + n_j \quad (3)$$

where
$h_{jm}$ is the M×1 vector representing the channel between mth transmit antenna and jth receive antenna,
F is the M×M DFT matrix whose entry corresponding to the pth row and qth column is given by $\exp(-j_M{}^{2\pi}pq)$, $S_m$ is the $Q_m \times M$ selection matrix that chooses the $Q_m$ rows of the DFT matrix according to the pilots chosen in the mth slot, $P_m$ is the diagonal matrix, that is, the power loading matrix that determines the power allocated to the pilot subcarriers, and $n_j \sim CN(0,1)$ is the additive white Gaussian noise for the selected pilot tones.

Note that in this model only one transmit antenna is active for any subcarrier at any time slot. This constraint is required for developing the results herein. However, that the results herein also hold true for the more generalized model.

It can be noticed that the training stage entails a total of $$\sum_{m=1}^{n_t} Q_m$$

pilots to estimate $n_t n_r$ channels. A theoretical limit on the number of pilots required for perfect channel recovery in an ideal noiseless system can be established, and the limit can be approached with efficient practical algorithms. The algorithms, therefore, should exploit the sparsity structure in the channels, enabling reduced training overhead while maintaining the desired quality of the channel estimate.

The channel estimation problem considered herein falls under the category of underdetermined system since the problem is to estimate the response for a large number of subcarriers using a limited number of observations. Mathematically, one can determine the M×1 vector x from the Q×1 vector b=Ax where Q<M. In general, there are many solutions to this problem and x cannot be uniquely determined. However, if we impose the constraint that x has a very few nonzero values, T at most, then x can be uniquely reconstructed from b under certain conditions. Only 2T observations of the signal are required in the DFT domain to reconstruct the channel perfectly if the size of the DFT M is prime. It is further shown that the reconstruction problem is equivalent to the following optimization problem:

$$\min\|x\|_0 \; s.t. \; Ax = b \quad (4)$$

where $\|x\|_0$ represent the L0-norm of the vector x.

In order to deal with MIMO sparse channels, the following definitions for sparsity structure can be used.

Definition 1: A vector f of length M is said to have a sparsity of T if the number of nonzero entries of f is less than or equal to T. That is $$\sum_{j=1}^{M} \delta_f(j) \le T$$

where $\delta_f(j) = 1$ if $f(j) \ne 0$ and 0 otherwise.

Definition 2: A set of vectors $\{f_1, f_2, f_L\}$ is said to have a common sparsity structure of size T if for any i and k $$\sum_{j=1}^{M} \delta_{f_i - f_k}(j) \le T : 5T \text{ and } \sum_{j=1}^{M} \delta_{f_k}(j) \le T : 5T.$$

One finds the minimum number of pilots required to perfectly reconstruct all the channels at the receiver for the noiseless case. Again, assume that the vectors have a common sparsity structure of size T. The MIMO channel reconstruction problem is posed as follows: Given the observations of the channel in the frequency domain $$b_{jm} = A_m h_{jm}, \; m = j = 1, 2, \ldots, n_r \quad (5)$$

One needs to find the conditions to uniquely determine the channel. Also, what is the minimum number of pilots required to reconstruct all the channels? The following theorem provides the answer for the case of prime M.

It can be shown that for the linear inverse problem with M being prime, "perfect reconstruction" of all the vectors is guaranteed if and only if $\max\{Q_1, Q_2, \ldots, Q_{n_t}\} \ge 2T$ and $\min\{Q_1, Q_2, \ldots, Q_{n_t}\} \ge T$.

This suggests that only $(n_t+1)T$ pilots are required to completely reconstruct the set of $n_t n_r$ channels. The best pilot allocation policy is to allocate 2T pilots for one transmit antenna and T pilots to the rest of the antennas. The following optimization problem successfully identifies the set of channels if the conditions above are satisfied.

$$\min \max\{\|h_{j1}\|_0, \|h_{j2}\|_0, \ldots, \|h_{jn_t}\|_0\} \quad (6)$$

$$s.t. \; b_{jm} = S_m F h_{jm}, \; m = 1, 2, \ldots, n_t \quad (7)$$

First, note that recovering the channels associated with any one of the receivers is sufficient to recover all the channels. In a SIMO system, there is no reduction in the number of pilots due to multiple observations at the receiver. With 2T pilots from the transmitter, each receive antenna has 2T pilots. The extra observations due to multiple receive antennas do not help in reducing training overhead.

Our objective is to minimize the following sparsity measure:

$$J^{(p)}(x) = \sum_{i=1}^{L} \left( \sum_{l=1}^{n_t} \sum_{r=1}^{n_r} |h_{rl}(i)|^2 \right)^{p/2} \quad (8)$$

When p<2, the above metric is well known to identify sparse. Define x, the concatenated vector of all channels to be $$x^T = [h_{11}{}^T h_{12}{}^T \ldots h_{1n_t}{}^T \ldots h_{n_r 1}{}^T h_{n_r 2}{}^T \ldots h_{n_r n_t}{}^T].$$

Similarly let $b = [b_{11} b_{12} \ldots b_{1n_t} \ldots b_{n_r 1} b_{n_r 2} \ldots b_{n_r n_t}]$ be the combined observation vector. Then, the output of the algorithm during the $(k+1)^{th}$ iteration will be $$x_{k+1} = \Pi^{-1}(x_k) A^T (A \Pi^{-1}(x_k) A^T)^{-1} b \quad (9)$$

where A is a block diagonal matrix with matrices $A_{ij}$'s on its diagonal as shown below:

$$A = \begin{bmatrix} A_{11} & 0 & \ldots & 0 \\ 0 & A_{12} & 0 & \ldots \\ 0 & 0 & \ddots & 0 \\ 0 & \ldots & 0 & A_{n_r n_t} \end{bmatrix}$$

Here $\Pi(x) = D(x) \hat{R} I_{n_t n_r}$ where $$D = \text{diag}\left( \left( \sum_{l=1}^{n_t} \sum_{r=1}^{n_r} |h_{rl}(i)|^2 \right)^{(p-2)/2} \right).$$

The algorithm can be terminated after running for a fixed number of iterations or when $$\frac{\|x_{k+1} - x_k\|^2}{\|x_k\|^2} < \epsilon.$$

In our numerical analysis, we fix E=0.01.

Next, an efficient matching pursuit algorithm that exploits the sparsity structure of the channel is provided. The algorithm can be used in a nonideal system where the observations are corrupted by noise and the FFT size is not prime. While the result in Theorem 1 does not apply in a nonideal scenario, we will later see that design guidelines can be obtained from the theorem even for nonideal scenarios, where the effect of noise is incorporated in the observations.

The matching pursuit (MP) algorithms work by sequentially selecting a small subset of the tap positions that contribute to most of the energy in the receive observations. In one scenario, although the tap positions are the same, there are different observations for different transmit-receive antenna pairs. Further, the length of the observation, e.g. the number of pilots, is not the same for all antennas. Therefore, a robust algorithm that can handle these scenarios is needed.

To begin with, a simple algorithm (OMP1) to convey the essence of the robust algorithm is provided. To avoid multiple subscripts, only consider the case of 2×1. The algorithm can be readily extended to the general $n_t \times n_r$ case. At each iteration of the simple algorithm, choose a tap position that minimizes the sum of the norm-squared residue vector. The residue vectors or residues for the first iteration are set as $b_1^0 = b_1$ and $b_2^0 = b_2$. At the first iteration, the tap position that maximizes the following is chosen:

$$k_1 = \underset{j}{\mathrm{argmax}} |A_{1j}^\dagger b_1^0|^2 + |A_{2j}^\dagger b_2^0|^2 \quad j \in \{1, 2, \ldots, M\} \quad (10)$$

where $A_{1j}$ is the jth column of $A_1$. The residues are then updated as $$b_1^1 = P_{A_{1j}}^\perp b_1^0$$

and $$b_2^1 = P_{A_{2j}}^\perp b_2^0$$

where $P_W$ and $P_W^\perp$ are the standard projection operations given by $$P_W = W(W^t W)^{-1} W^t, \quad P_W^\perp = I - W(W^t W)^{-1} W^t.$$

At every iteration, the above procedure is followed to add a column to the set of already selected columns. The residues are calculated such that they are orthogonal to the set of selected columns.

The above simple algorithm gives equal weight to both the observations although $Q_1$ may not be equal to $Q_2$. Further, for the case of perfect reconstruction of the channels with the minimum number of pilots, only one observation vector is used to identify the nonzero tap positions which are common to both vectors. Therefore, giving equal weight to the observation vectors during the column selection stage need not yield the best performance. The following metric can be used to select a column during each iteration: At the pth iteration, choose a column that minimizes the weighted sum of q-norm of the residues where q>0. That is, the index of the selected column during pth iteration is $$k_p = \underset{j}{\mathrm{argmin}} \min_{x_1, x_2} w_1 \| b_1 - [C_1^{p-1} A_{1j}] x_1 \|^q + \quad (11)$$
$$w_2 \| b_2 - [C_2^{p-1} A_{2j}] x_2 \|^q$$

$$= \underset{j}{\mathrm{argmin}} w_1 \| P_{C_1^p(j)}^\perp b_1 \|^q + w_2 \| P_{C_2^p(j)}^\perp b_2 \|^q \quad (12)$$

$$= \underset{j}{\mathrm{argmin}} w_1 \| b_1 - P_{C_1^{p-1}(j)} b_1 - P_{A_{1j}^{p-1}} b_1 \|^q + \quad (13)$$
$$w_2 \| b_2 - P_{C_2^{p-1}(j)} b_2 - P_{A_{2j}^{p-1}} b_2 \|^q$$

$$= \underset{j}{\mathrm{argmin}} w_1 \| b_1^{p-1} - P_{A_{1j}^{p-1}} b_1^{p-1} \|^q + \quad (14)$$
$$w_2 \| b_2^{p-1} - P_{A_{2j}^{p-1}} b_2^{p-1} \|^q$$

$$= \underset{j}{\mathrm{argmin}} w_1 \| b_1^{p-1} - A_{1j}^{p-1} (A_{1j}^{(p-1)\dagger} b_1^{p-1}) \|^q + \quad (15)$$
$$w_2 \| b_2^{p-1} - A_{2j}^{p-1} (A_{2j}^{(p-1)\dagger} b_2^{p-1}) \|^q$$

$$= \underset{j}{\mathrm{argmin}} w_1 (\| b_1^{p-1} \|^2 - |A_{1j}^{p-1\dagger} b_1^{p-1}|^2)^{\frac{q}{2}} + \quad (16)$$
$$w_2 (\| b_2^{p-1} \|^2 - |A_{2j}^{p-1\dagger} b_2^{p-1}|^2)^{\frac{q}{2}}$$

where $C_i^{p-1}$ is the matrix whose columns contain the selected columns of $A_i$ until the (p−1)th iteration. In the optimization problem, the size of $x_i$ is p×1.

$$C_1^p(j) = [C_1^{p-1} A_{1j}] \quad C_2^p(j) = [C_2^{p-1} A_{2j}]$$

and $A_{1j}^{p-1} = P_{C_1^{p-1}}^\perp A_{1j} \quad A_{2j}^{p-1} = P_{C_2^{p-1}}^\perp A_{2j}$ FIG. 1 is a schematic diagram of the inventive system with multiple embodiments. As discussed above, the inventive system exploits the sparsity structure of MIMO channels 10. Two approaches can be taken for the sparse channel estimation of MIMO ISI channels in MIMO OFDM systems. One is a channel estimation process 12, and another is a pilot placement and pilot allocation process 14. In accordance with the channel estimation process 12, one of joint MP 14 and modified FOCUSS 16 can be performed. The MP 14 can include one or more embodiments, including weighted correlation metric 18, weight optimization 20, weighted residue 22, varied termination criteria 24, regularized inversion 26 and multiple column selection 28.

The weighted correlation metric 18 can include a sum correlation metric for the special case of equal observations and with the same pilot positions for all the antennas. The weight optimization 20 can include the following design criterion.

If $Q_1 = Q_2$, $w_1 = w_2$.
If $Q_1 > 2Q_2$, w1=1 and w2=0 is optimal.
If Q1>$Q_2$, and $Q_1$<$2Q_2$, w1=0.5 to 1.

The weighted residue 22 considers $w_1 \|b_1^F\|^2 + w_2 \|b_2^F\|^2$ as the metric to be considered for termination.

Various termination 24 criterion can include the following. The algorithm can be stopped if the weighted residue 22 falls below a threshold or if the maximum number of iterations has been reached. The threshold value can depend on the SNR and other parameters of the system. In one embodiment, a threshold dependent upon covariance matrices of the error can be used.

Regularized inversion 26 can be performed instead of taking the pseudo inverse. In particular, MMSE type of inversion will yield better benefits at low SNR. The regularization factor is determined by SNR. Typically, the (I/SNR)*I identity matrix is added before inversion.

Multiple selection of columns 28 can be performed as discussed in more detail below.

Figure 2:
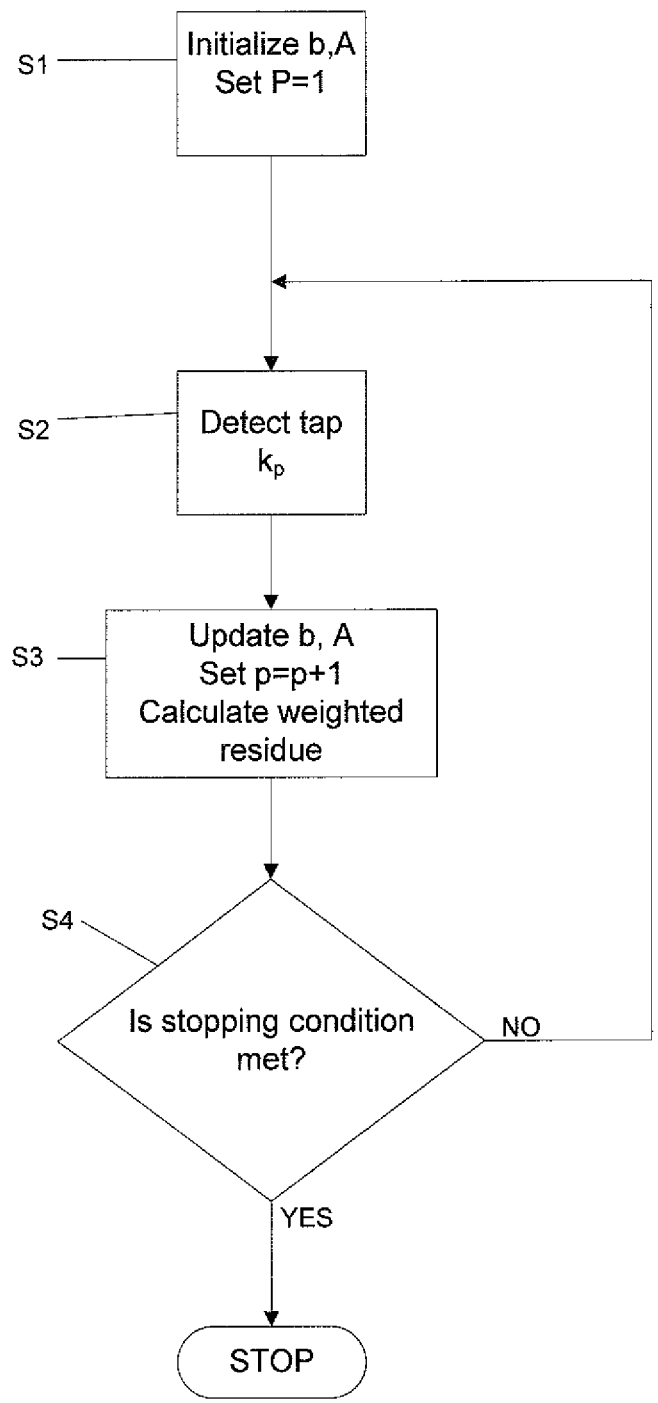
FIG. 2 is a flow diagram of one embodiment of the inventive method.

FIG. 2 is a flow diagram of the step-by-step procedures for OMP1.

Step S1 is Initialization, in which the observation vectors are initialized as residue vectors or residues $b_1^0 = b_1$ and $b_2^0 = b_2$. In addition, the generating matrices are initialized as $A_1^0 = A_1$ and $A_2^0 = A_2$ and tap positions are initialized as shown in (10) above.

Step S2 is Tap Detection, in which the column selection metric can be obtained by using q=2 in (16). The "best" column of A with respect to b is selected. In the pth iteration, the column selection metric becomes $$k_p = \operatorname*{argmax}_{j} w_1 |A_{1j}^{(p-1)*} b_1^{p-1}|^2 + w_2 |A_{2j}^{(p-1)*} b_2^{p-1}|^2 \qquad (17)$$

Step S3 is Update, wherein the set of selected columns is updated as $C_i^p(j) = [C_i^{p-1} A_{ik_p}]$. and the selected column from step S2 is removed from A.

The residues $b_1^p$ and $b_2^p$ are updated as $$b_1^p = (I - P_{C_1^p}) b_1^{p-1}$$

$$b_2^p = (I - P_{C_2^p}) b_2^{p-1} \qquad (18)$$

The generating matrices are updated as $$A_1^p = nrm(P_{C_1^p}^\perp A_1^{p-1})$$

$$A_2^p = nrm(P_{C_2^p}^\perp A_2^{p-1}) \qquad (19)$$

where the nrm function normalizes the columns of the argument.

Step S4 is a Stopping Condition; the algorithm continues to iterate until the maximum number of iterations is reached or the weighted norm-squared residue goes below a threshold, i.e. $w_1 \|b_1^F\|^2 + w_2 \|b_2^F\|^2 \le \epsilon$. In systems with noise, E is determined according to the signal to noise ratio (SNR). In general, the greater the SNR, the lower the value of E. In our numerical analysis, we assume E=0.01 for the noiseless case.

Convergence: It is straightforward to notice that the algorithm converges since the metric (weighted squared norm residue) decreases with each iteration.

Tap gain regeneration: After determining the set of columns to represent the given observations, the estimate of the channels at the selected tap positions are obtained through $(C_i^{P^t} C_i^P)^{-1} C_i^P b_i$. For the case of noisy observations, the pseudo inverse can be replaced by a regularized inverse. That is, the tap values for the selected column indices can be obtained from $$\left( C_i^{p^t} C_i^p + \frac{1}{SNR} I \right)^{-1} C_i^{p^t} b_i$$

This embodiment is Mean Square Error (MSE) based orthogonal MP. [0051] Note that both the residue $b_1^F$ and the updated generated matrix $A_1^F$ are orthogonal to the matrix $C_t^F$.

MP algorithms are attractive as they enable low complexity implementations. Next, methods to further reduce the complexity of the algorithm without incurring significant performance loss are presented.

Figure 3:
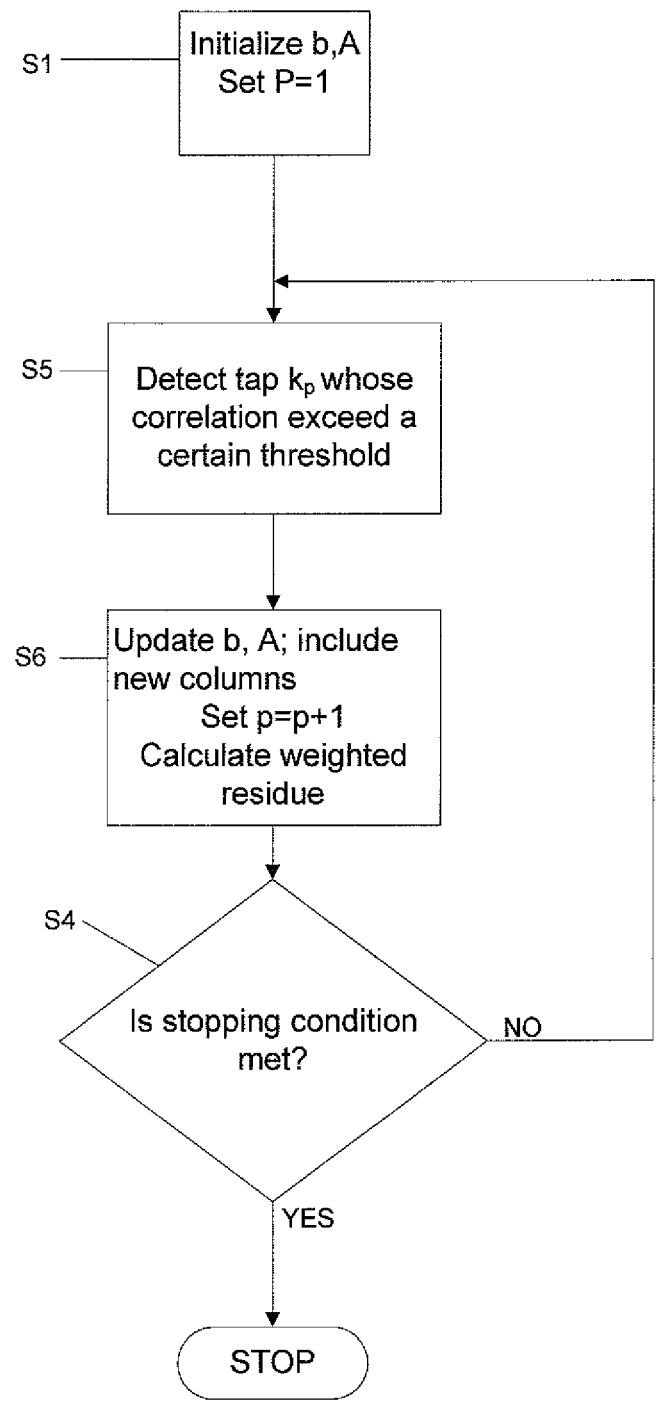
FIG. 3 is a flow diagram of another embodiment of the inventive method.

The joint or MIMO MP can be made faster by selecting multiple columns at every iteration, using a multiple selection of columns 26. In an exemplary embodiment of the present invention, step S2 selects a set of columns whose weighted sum of absolute squared correlation exceeds a threshold. The optimization of threshold itself is a challenging problem. However, with numerical analysis, an appropriate threshold can be determined offline for any channel model. The main steps of the embodiment having multiple column selection are shown in FIG. 3 and are described as follows:

The residues are initialized as before, in step S1.

In step S5, tap detection involves selecting not one but a set of columns whose correlation with the residue exceeds a certain threshold. That is, the set containing the indices of the selected columns is $$K_p\{j : w_1 |A_{ij}^{(p-1)*} b_1^{F-1}|^2 + w_2 |A_{2j}^{(p-1)*} b_2^{F-1}|^2 \ge t_p\}$$

where $t_p$ is the threshold during the pth iteration.

Step S6, the update stage, involves including the new columns in the selected columns list:

$$C_i^p(j) = [C_i^{p-1} \{A_i\}_{K_p}]$$

where $\{A_i\}_{K_p}$ contains the columns of $A_i$ corresponding to $K_p$. The residues and the generating matrices are updated as given in (18) and (19).

The same stopping condition, S4, as in the original algorithm can be used.

Allowing multiple columns to be selected at each stage may result in selection of a set of columns that are linearly dependent. This is not a possibility in the original algorithm because only one column is selected at each stage. Therefore, in S5, it is necessary to select just the representative columns before the projection operation is performed. The threshold value is a crucial parameter in this algorithm. Setting it very high results in no columns getting selected at each stage resulting in longer algorithm runtime. On the other hand, setting it too low results in many columns getting selected resulting in rank deficiency problems.

A careful analysis of the MIMO MP algorithm OMP1 reveals that the update stage involves the maximum complexity. The complexity is especially significant when the number of channels is large since each and every matrix needs to be updated. In this regard, having the same generating matrix for all the channels will be useful. This is easily possible if all the transmit antennas have an equal number of pilots and choose the same subcarriers for the pilots. Another simple solution will be to not update the generating matrices at all. That is $$A_i^p = A_i \forall p.$$

This does not affect the orthogonality of the residue with respect to the previously selected columns and, therefore, the convergence of the algorithm is not affected. This algorithm is called OMP2. The performance loss by not updating the generating matrices can be shown to be insignificant.

Pilot placement 14 can be a critical parameter in the design of MP algorithms. Often, random pilot placement, such as placing the pilots randomly in the various subcarriers, performs very well. For example, suppose, in a 2×1 system, $Q_1$ pilots from antenna 1 and $Q_2$ pilots from antenna 2 are sent. Let $Q_1 = Q_2$. It can be shown that choosing the pilots randomly for each antenna performs better than choosing the same set of subcarriers.

It is known in art to use a fixed pilot positioning scheme in which, starting with the first subcarrier, the pilots are chosen such that the interval between two adjacent pilot subcarriers increases by one. This pilot placement procedure is followed until there are more than M/2 subcarriers. The remaining pilots are placed at the end of the symbol. For example, if M=10 and Q=5, the pilot position set is {1,2,4,7,10}.

Pilot allocation 14 can also be critical. Given Q pilots in total for the transmit antennas in a 2×1 system, how many pilots should be allocated to the first transmit antenna? Is $$(Q_1, Q_2) = \left(\frac{Q}{2}, \frac{Q}{2}\right)$$

better than other allocations, for example $$(Q_1, Q_2) = ?\left(\frac{2Q}{3}, \frac{Q}{3}\right).$$

The above theory of perfect reconstruction shows that for the minimum number of pilots case, the optimal approach is to allocate 2T pilots to one channel and T pilots to each of the other channels. Equal pilot allocation is not optimal for the ideal case. This is also validated for the joint matching pursuit algorithm. A comparison can be performed of the accuracy performance of the joint and independent MP algorithms for different pilot allocations as a function of $w_1$, the weight for the first channel. For each pilot allocation, the optimal weights for the joint MP is numerically determined. Since the performance of the independent MP is determined by the performance of its worst channel, $Q_1$=is optimal. However for the joint MP, equal pilot allocation is never optimal. The best strategy is to allocate more pilots for one channel so that its estimate for the common tap positions are more accurate. Once it is obtained, the second channel can be estimated for those tap positions using the observations for the second channel. The same intuition holds for the L1-optimization algorithm as well. That is, the best pilot allocation policy is to allocate to one channel slightly greater than 2T pilots and split the remaining pilots equally among other channels.

The invention can be implemented as computer software or a computer readable program for operating on a computer. The computer program can be stored on computer readable medium. Various aspects of the present disclosure may be embodied as a program, software, or computer instructions embodied in a computer or machine usable or readable medium, which causes the computer or machine to perform the steps of the method when executed on the computer, processor, and/or machine.

System and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

While the present invention has been described in particular embodiments, it should be appreciated that the present invention should not be construed as limited by such embodiments, but rather construed according to the below claims.

What is claimed is:

1. A method for sparse channel estimation in Multiple Input Multiple Output Orthogonal Frequency Division Multiplexing (MIMO OFDM) systems with a plurality of subchannels having same sparsity structure, said method comprising steps of: initializing a plurality of residual vectors modeling a plurality of subcarriers; initializing observation generating matrices modeling the channel; sending at least one pilot signal for each of a plurality of subcarriers; converting the pilot signals to tap positions in the residual vectors; detecting an optimal tap position in one of the residual vectors; updating the plurality of residual vectors by removing the one residual vector having the optimal tap position; updating the observation generating matrices in accordance with the residual vector having the optimal tap position; calculating, using a computer, weighted residuals based on the updated residual vectors; and repeating the steps of sending, converting, detecting, updating the residual vectors, updating the observation generating matrices, and calculating the weighted residuals, until a stopping condition is met, wherein the updated observation generating matrices estimate the sparse channel.

2. The method according to claim 1, wherein all of the subchannels are treated jointly.

3. The method according to claim 1, wherein the step of sending comprises randomly placing the pilot signals in each of the subcarriers.

4. The method according to claim 1, wherein the step of sending comprises using an optimal approach to allocate the pilot signals to the subcarriers.

5. The method according to claim 1, wherein the stopping condition is one of a maximum number of iterations, and the weighted residuals are less than a threshold.

6. A method for sparse channel estimation in Multiple Input Multiple Output Orthogonal Frequency Division Multiplexing (MIMO OFDM) systems with a plurality of subchannels having same sparsity structure, said method comprising steps of: initializing a plurality of residual vectors modeling a plurality of subcarriers; initializing observation generating matrices modeling the channel; sending at least one pilot signal for each of a plurality of subcarriers; converting the pilot signals to tap positions in the residual vectors; updating the plurality of residual vectors by removing all of the residual vectors exceeding a correlation threshold; updating the observation generating matrices in accordance with the residual vector having the optimal tap position; calculating, using a computer, weighted residuals based on the updated residual vectors; and repeating the steps of sending, converting, detecting, updating the residual vectors, updating the observation generating matrices, and calculating the weighted residuals, until a stopping condition is met, wherein the updated observation generating matrices estimate the sparse channel.

7. The method according to claim 6, wherein all of the subchannels are treated jointly.

8. The method according to claim 6, wherein the step of sending comprises randomly placing the pilot signals in each of the subcarriers.

9. The method according to claim 6, wherein the step of sending comprises using an optimal approach to allocate the pilot signals to the subcarriers.

10. The method according to claim 6, wherein the stopping condition is one of a maximum number of iterations, and the weighted residuals are less than a threshold.

11. A method for sparse channel estimation in Multiple Input Multiple Output Orthogonal Frequency Division Multiplexing (MIMO OFDM) systems with a plurality of subchannels having same sparsity structure, said method comprising steps of: initializing a plurality of residual vectors modeling a plurality of subcarriers; initializing an observation generating matrix modeling the channel; sending at least one pilot signal for each of a plurality of subcarriers; converting the pilot signals to tap positions in the residual vectors; detecting an optimal tap position in one of the residual vectors; updating the plurality of residual vectors by removing the one residual vector having the optimal tap position; updating the observation generating matrix in accordance with the residual vector having the optimal tap position; calculating, using a computer, weighted residuals based on the updated residual vectors; and repeating the steps of sending, converting, detecting, updating the residual vectors, and calculating the weighted residuals, until a stopping condition is met, wherein the updated observation generation matrix estimates the sparse channel.

12. The method according to claim 11, wherein all of the subchannels are treated jointly.

13. The method according to claim 11, wherein the step of sending comprises randomly placing the pilots in each of the subcarriers.

14. The method according to claim 11, wherein the step of sending comprises using an optimal approach to allocate the pilots to the subcarriers.

15. The method according to claim 11, wherein the stopping condition is one of a maximum
number of iterations, and the weighted residuals are less than a threshold.

\* \* \* \* \*